US011232926B2

(12) United States Patent
Terletska et al.

(10) Patent No.: US 11,232,926 B2
(45) Date of Patent: Jan. 25, 2022

(54) CATHODE FOR AN X-RAY TUBE

(71) Applicant: KONINKLIJKE PHILIPS N.V., Eindhoven (NL)

(72) Inventors: Zoryana Terletska, Hamburg (DE); Tobias Schlenk, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 390 days.

(21) Appl. No.: 15/775,636

(22) PCT Filed: Oct. 28, 2016

(86) PCT No.: PCT/EP2016/076005
§ 371 (c)(1),
(2) Date: May 11, 2018

(87) PCT Pub. No.: WO2017/080843
PCT Pub. Date: May 18, 2017

(65) Prior Publication Data
US 2018/0350550 A1 Dec. 6, 2018

(30) Foreign Application Priority Data
Nov. 13, 2015 (EP) .................................... 15194511

(51) Int. Cl.
*H01J 35/06* (2006.01)
*G01N 23/04* (2018.01)
*H01J 9/18* (2006.01)

(52) U.S. Cl.
CPC ............ *H01J 35/066* (2019.05); *G01N 23/04* (2013.01); *H01J 9/18* (2013.01)

(58) Field of Classification Search
CPC .. H01J 35/06; H01J 35/08; H01J 35/14; H01J 35/10; H01J 35/45; H01J 3/45; H01J 9/18; H01J 9/42; G01N 23/04
See application file for complete search history.

(56) References Cited

U.S. PATENT DOCUMENTS 3,875,028 A 4/1975 Atlee
5,031,200 A 7/1991 Plessis
(Continued)

FOREIGN PATENT DOCUMENTS

DE 4021709 A1 1/1992
FR 2699326 A1 6/1994
(Continued)

OTHER PUBLICATIONS

WO-2013175402-A1 (Year: 2013).*

*Primary Examiner* — David P Porta
*Assistant Examiner* — Mamadou Faye
(74) *Attorney, Agent, or Firm* — Larry Liberhcuk

(57) ABSTRACT

The invention relates to a cathode for an X-ray tube and a corresponding method for assembly. The cathode comprises a filament (22), at least two support structures (21), a body structure comprising a recess for the filament. The filament is provided to emit electrons towards an anode in an electron emitting direction (25). The filament is held by the support structures, which are fixedly connected to the body structure. The filament is totally recrystallized before assembly and has an at least partial helical structure. The support structures comprise a reception end (24) for releasably receiving two ends of the filament by means of a locking mechanism and the complete alignment of the filament and the recess is given by the geometry of the filament, the at least two support structures and the body structure which comprises a recess for the filament. An improved and facilitated cathode assembly with increased reliability of the precision of the positioning in operation is achieved.

9 Claims, 9 Drawing Sheets

(56) References Cited

U.S. PATENT DOCUMENTS

| | | | |
|---|---|---|---|
| 5,198,720 A | 3/1993 | Choi | |
| 5,526,396 A * | 6/1996 | Jacob | H01J 35/06 378/121 |
| 6,607,416 B2 | 8/2003 | Kautz | |
| 2005/0232396 A1 | 10/2005 | Chidster | |
| 2010/0040201 A1* | 2/2010 | Lee | H01J 35/06 378/136 |
| 2012/0027182 A1* | 2/2012 | Canfield | H01J 35/06 378/136 |
| 2016/0217965 A1* | 7/2016 | Canfield | H01J 35/045 |

FOREIGN PATENT DOCUMENTS

| | | | |
|---|---|---|---|
| GB | 1418039 | 12/1975 | |
| JP | S53132983 A | 11/1978 | |
| JP | H0452416 A | 2/1992 | |
| WO | WO-2013175402 A1 * | 11/2013 | H01J 9/042 |
| WO | WO2013175402 A1 | 11/2013 | |

\* cited by examiner

CATHODE FOR AN X-RAY TUBE

FIELD OF THE INVENTION

The present invention relates to a cathode for an X-ray tube, an X-ray tube, a system for X-ray imaging, and a method for assembly of a cathode for an X-ray tube.

BACKGROUND OF THE INVENTION

For the generation of X-ray radiation, for example in an X-ray tube, a filament is provided for emitting electrons to impinge on a surface, thereby generating X-ray radiation. In order to provide a focal spot of the incoming electrons on the target, the exact arrangement of the filament and its positioning within an optical system is required. Alterations of the filament during operation may lead to a change of the focal spot and thus to a change of the radiated X-ray beam. Therefore, care is taken for a correct positioning of the filament during assembly. For example, during a cathode cup assembly, the required filament shape and also the position of the filament in relation to the cathode head takes place with a predefined accuracy. This is achieved, for example, by manual adjustment. U.S. Pat. No. 6,607,416 B2 describes a fixture for using a mandril to set a filament on an electrode for mounting the filament on a cathode head. However, it has been shown that the securing of the filament ends in the cavities of the cathode may still require final position relating to the direction of the emitted electrons. Further, also the correct alignment of the mounting tool in relation to the cathode cup for properly positioning the filament in the first place has to be carefully monitored.

WO 2013/175402A1 discloses a cathode for an X-ray tube with an improved and facilitated assembly.

U.S. Pat. No. 5,526,396 A discloses an X-ray tube, comprising a cathode arrangement including a filament, wherein simple adjustment of the position of the filament is achieved.

SUMMARY OF THE INVENTION

Thus, there may be a need to provide a cathode with an improved and facilitated assembly with increased reliability of the precision of the positioning in operation.

The object of the present invention is solved by the subject-matter of the independent claims, wherein further embodiments are incorporated in the dependent claims.

It should be noted that the following described aspects of the invention apply also for the cathode for an X-ray tube, the X-ray tube, the system for X-ray imaging, and the method for an assembly of a cathode for an X-ray tube.

According to a first aspect of the present invention a cathode for an X-ray tube is provided, comprising a filament, at least two support structures, a body structure comprising a recess for the filament. The filament is provided to emit electrons towards an anode in an electron emitting direction. The filament is held by the support structures, which are fixedly connected to the body structure. The filament is totally recrystallized. The support structures comprise a reception end for releasably receiving two ends of the filament by means of a locking mechanism and the alignment of the filament and the recess is given by the geometry of the filament, the at least two support structures and the body structure comprising a recess for the filament.

The filament exhibits a helical structure that serves as the electron emitting surfaces in operation and ending parts that serve as counter pieces to reception ends of the support structures.

The term "electron emitting direction" relates to the main direction of electrons as defined by a line connecting a central portion of the filament with a central portion of a focal spot on the anode.

The core idea of the invention is to avoid state-of-the-art alignment steps in the assembly procedure by using components fabricated with high precision at the crucial regions and removing inherent stress through thermal treatment of the components. In the state of the art assembly procedure there may be as many as 20 steps including alignment of the filament. According to the present invention this number is reduced to about 5 steps and no further alignment steps are required because of the inherent manufacturing precision of the proposed cathode structure. Furthermore, since the filament is already totally recrystallized, no misalignment of the filament occurs due to recrystallization. Apart from the advantage that there is reduced plastic deformation over lifetime an improved lifetime distribution by a reduction of failure modes during operation is achieved.

According to the invention the filament has a complete helical structure extending from one end of the filament to the other end of the filament.

The whole filament has a helical structure that can be releasably received by appropriate reception ends of the support structures by means of a locking mechanism. The filament has a helical structure extending from one end of the filament to the other end of the filament. The support structures comprise a reception end for releasably receiving two helical ends of the helical structure by means of a locking mechanism. Because the total filament has a helical structure the alignment is per definition correct with respect to the reception ends of the support structures. There are no non-helical ends of the filament which may cause misalignment.

According to an exemplary embodiment the longitudinal direction around which the helical winding of the filament is provided is substantially straight. Thus, any susceptibility to change in the length of the helical winding is avoided.

According to an exemplary embodiment the middle portion of the helical structure has a first helical pitch and the helical ends of the helical structure have a second helical pitch. The second helical pitch may e.g. be larger than the first helical pitch. This has the advantage that only the portion of the helical structure with a lower pitch will start glowing so that the helical ends stay relatively cool.

According to an exemplary embodiment the locking mechanism of the support structure comprises a notch. This has the advantage of easy assembly of the helical winding, possibly without the need for additional soldering steps and a good mechanical stability. For stable electrical contacting preferably the support and filament are laser welded.

Preferably the notch has a geometrical shape to firmly receive the helical ends without mechanical play. Different notch shapes can be envisaged like ¾ cylinder, half cylinder, trough, rectangle, sideway ¾ cylinder, tapered ¾ cylinder, 3g: thin ¾ cylinder.

It is remarked that pretension of the filament is not necessary since the helical geometry of the filament can absorb the tension originating from thermal expansion during operation. The connection to the rigid support structure helps to avoid distortion compared to state-of-the-art filament geometries as in FIG. 1b.

According to a further exemplary embodiment the body structure is provided as a cathode cup comprising a recess in comprising the filament which is fixedly held.

This has the advantage that the recess defines the electrostatic potential landscape and therefore the electron optics dependent on the relative positioning of filament.

According to a further exemplary embodiment the cathode cup is provided with at least two filaments facing the anode.

This has the advantage that different focal spot sizes for different filaments or replacement emitters for longer lifetime can be realized.

According to a further exemplary embodiment the cathode cup is provided as a ceramic cathode cup made from electrically non-conducting ceramic and wherein a part of the cathode cup's surfaces is provided with a metallic coating.

This has the advantage that fewer parts are needed and the number of tolerances is reduced. Therefore, the assembly process can be cheaper and more precise.

The term "non-conducting" means electrically insolating. The metallic coating is also referred to as a metalized surface. The metallic coating is provided for electric conducting purposes, and for brazing purposes. For example, the cathode cup is made from aluminium oxide ($Al_2O_3$). The cathode may also be made from aluminium nitrate (AlN).

According to a second aspect of the present invention, an X-ray tube is provided, comprising a cathode and an anode. The cathode is provided as a cathode according to one of the above mentioned examples.

According to a third aspect of the present invention, a system for X-ray imaging is provided, comprising an X-ray source, an X-ray detector, and a processing unit. The processing unit is configured to control the X-ray source and the X-ray detector for providing X-ray image data of an object of interest. The X-ray source is provided with an X-ray tube as described and discussed above.

The X-ray system may be a medical imaging system.

According to a further example, an inspection apparatus is provided as the X-ray system, for example for scanning and screening of luggage or transportation pieces, or for material and construction inspection purposes.

According to a fourth aspect of the present invention a method for assembly of a cathode for an X-ray tube is provided. The method comprises the following steps:
a) providing a cathode cup with at least two support structure holes;
b) inserting and soldering at least two support structures in the support structure holes;
c) machining a recess, forming a filament cavity, into the cathode cup;
d) in the same machining action as step c) machining the support structures by forming a notch at the top of each of the support structures to receive the end of a helical filament; and
e) inserting each end of a totally recrystallized filament, having at least a partial helical structure, into each of the notches of the support structures.

According to a fifth aspect of the present invention a method for assembly of a cathode for an X-ray tube is provided. The method comprises the following steps:
a') providing a cathode cup with at least two support structure holes;
b') machining a recess, forming a filament cavity, into the cathode cup;
c') inserting and soldering at least two support structures in the support structure holes;
d') machining the support structures by forming a notch at the top of each of the support structures to receive the end of a helical filament; and
e') inserting each end of a totally recrystallized filament, having at least a partial helical structure, into each of the notches of the support structures. According to this fifth aspect of the invention the machining steps of c) and d) according to the fourth aspect of the invention are not performed in one action because steps b') and d') are separated by step c').

According to an exemplary embodiment, the filament has a complete helical structure extending from one end of the filament to the other end of the filament.

According to an exemplary embodiment, the machining is electrical discharge machining This has the advantage that the machining of the crucial parts of the cathode can be performed with high precision and reproducibility. Furthermore, the surface and edge conditions can be chosen in order to match the needs of a cathode head.

Before the inserting of step e), the total recrystallization of the filament is provided by applying external heat. The total recrystallization is thus not provided by an electric current applied to the two ends of the cathode to generate heat from inside, but rather by heat from outside of the filament, for example in an oven or furnace. According to the invention the total recrystallization process is performed in advance. It is not important how the recrystallization is achieved but only that the filament shows the total recrystallization property before assembly. Hence the total recrystallization may be achieved by any suitable method.

Because of a totally recrystallized filament, no further flashing is necessary. The term "flashing" refers to an application of a high current in order to let the filament glow for a predetermined short period of time. Thus, flashing provides a thermal treatment with the purpose of stabilizing the filament. This process is hard to control due to residual stress that can lead to warping of the filament. A totally recrystallized filament will have reduced plastic deformation over lifetime and an improved lifetime distribution by a reduction of failure modes.

A successful assembly is defined by the precision of position and orientation of the filament within the narrow slit of the recess or cavity (in operation, over time). The present invention suggests the fabrication of a cathode cup with braced supporting wires that exhibit high precision slots for the filament within the already machined recess and notches. Notably, the brazing of the supporting structures leads to a particular robust connection in operation. This intermediate cathode cup without filament can be manufactured in different ways. Two possibilities including one or two machining steps were described above. Machining is done by electrical discharge machining (EDM), preferably wire cut EDM.

In a first possibility the supporting structures are brazed in a cathode cup without recess. Afterwards, the notches in the supporting structures for the filament as well as the recess in the cathode head are machined in a single EDM step providing automatically perfect orientation. Finally, the filament is attached (typically laser welded or just by clicking it into the notch).

In a further possibility the recess is machined by EDM in a cathode cup body structure without supporting structures. Subsequently, the supporting structures are brazed into the body structure, showing no notch at that step. Afterwards, the notches for the filament are machined into the supporting structures with a second EDM step. Both steps have to be aligned precisely. This can be achieved by performing both EDM steps on a single machine with the same reception. Again, the filament is inserted or attached at last. For above possibilities, the filament is precisely manufactured and thermally treated to avoid contour changes in operation at high temperatures. This is done by total recrystallization of the filament material in advance.

According to a further aspect, no plasticity for adjustment is needed during the assembly. Therefore, the support of the filament can be directly brazed to the cathode or ceramic insulator and cathode with potentially higher thermal and mechanical loadability of the cathode by increased stability and less thermal drift with shorter elements and more direct connections.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 5d additionally shows a detailed close up of the support end and notch with filament inserted;

FIG. 7 shows an example for a system for X-ray imaging according to the present invention, wherein

DETAILED DESCRIPTION OF EMBODIMENTS

Figure 1A:
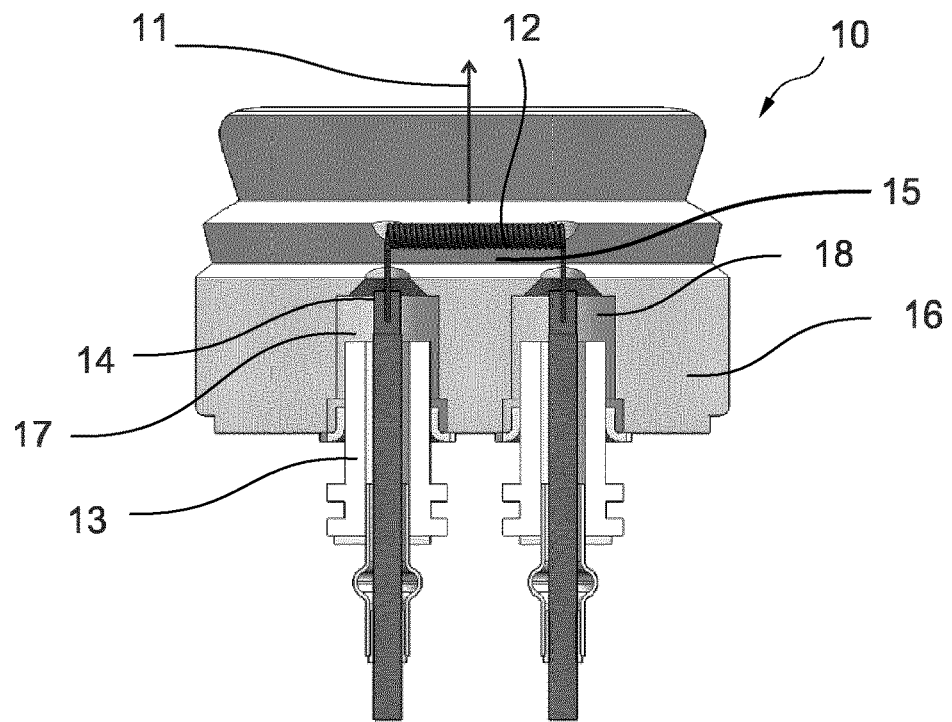
FIG. 1a schematically shows an example for a cathode for an X-ray tube according to the prior art showing the shape of a filament according to prior art in FIG. 1b.

FIG. 1a shows a cross sectional view of a known cathode 10 for an X-ray tube. The cathode 10 comprises a filament 12, a support structure 14, and a body structure 16. For example, the support structure 14 comprises a first mounting bolt 17 and a second bolt 18. Ceramics 13 for electrical insulation of filament and cathode head 10 are shown for two supports per filament but can also be used for a single support wire only.

Figure 1B:
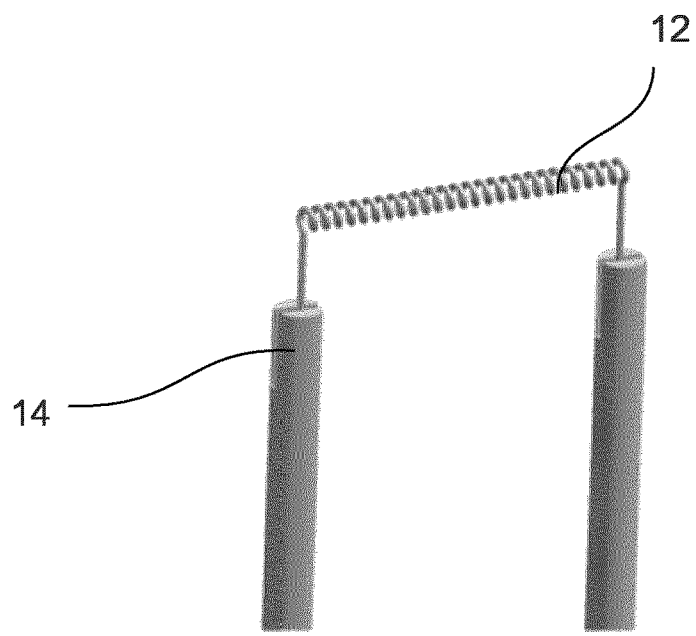

The filament 12 is provided to emit electrons towards an anode (not shown) in an electron emitting direction 11. For electron-optical reasons the filament is precisely positioned within a recess 15. The filament 12 at least partially comprises a helical structure. The filament 12 is held by the support structure 14, which is fixedly connected to the body structure 16. FIG. 1b shows that the filament 12 is held by the support structure 14.

The mounting bolts extending through the body structure 16 can have a respective connection at the side opposite to the side where the filament 12 is arranged. An electrical source provides the electrical current to the filament 12 (not further shown).

Figure 2A:
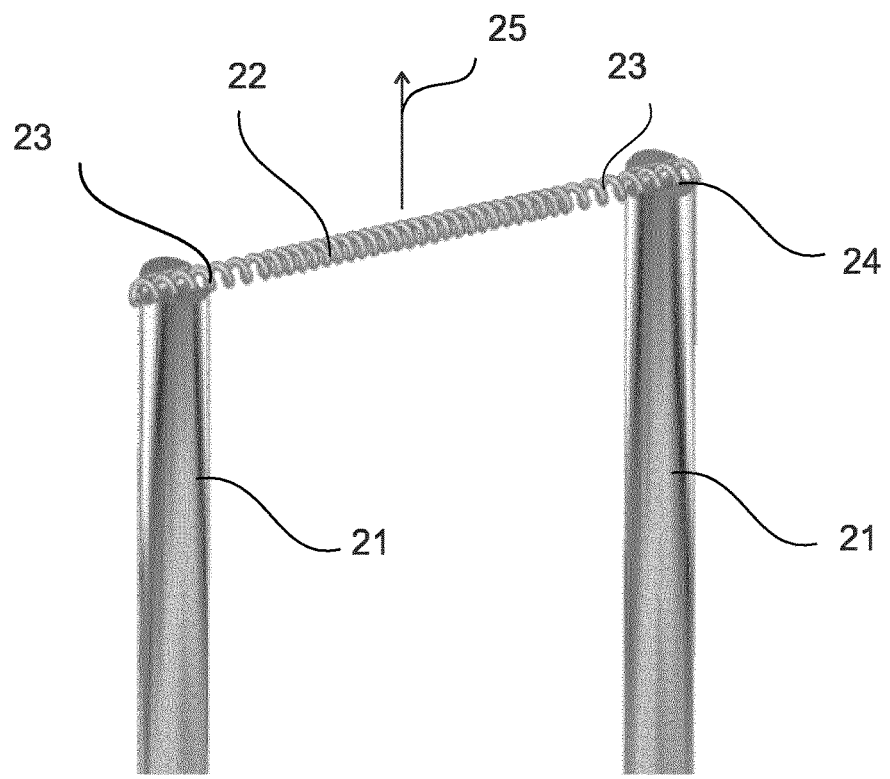
FIG. 2 shows an example of a filament held by two support structures of a cathode according to the present invention in a perspective view in FIG. 2a and two embodiments of the filament structure in FIGS. 2b and 2c.
Figure 2B:
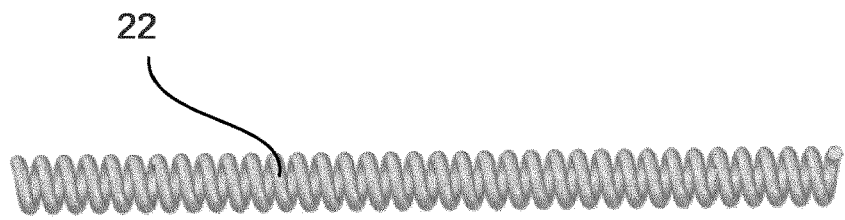
Figure 2C:
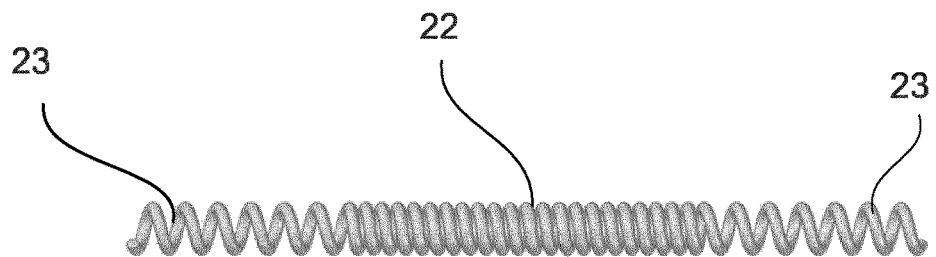
Figure 3A:
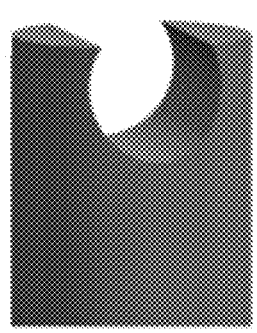
FIGS. 3a to 3h show 8 examples of locking mechanisms of the support structure of a cathode for an X-ray tube according to the present invention.
Figure 3B:
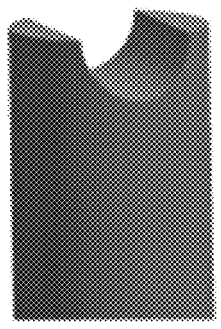
Figure 3C:
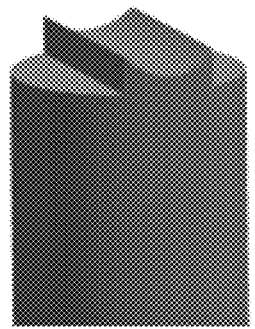
Figure 3D:
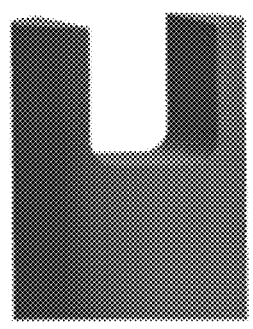
Figure 3E:
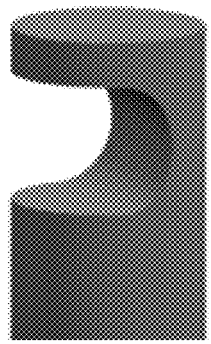
Figure 3F:
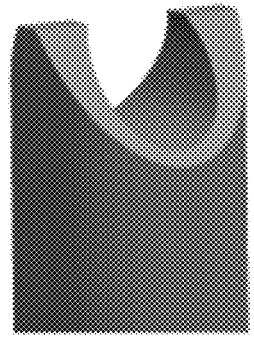
Figure 3G:
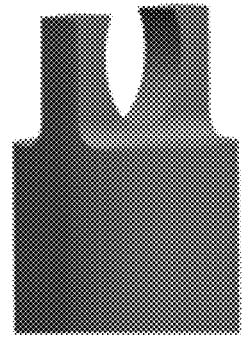
Figure 3H:
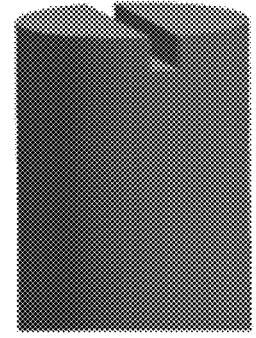

In FIG. 2a a filament 22 and two support structures 21 are shown in a perspective view. In FIGS. 2b and 2c two embodiments of filaments are shown. The filament and two support structures are present in a body structure (not shown). The filament is provided to emit electrons towards an anode in an electron emitting direction 25. The filament is held by the support structures 21, which are fixedly connected to the body structure. The filament has a helical structure (22, 23) extending from one end of the filament to the other end of the filament; and the support structures 21 comprise a reception end 24 for releasably receiving two helical ends of the helical structure 22 by means of a locking mechanism. The longitudinal direction around which the helical winding of the filament is provided is substantially straight.

In FIG. 2c the middle portion of the helical structure 22 has a first helical pitch and the helical ends 23 of the helical structure have a second helical pitch. In this example the second helical pitch is larger than the first helical pitch. The locking mechanism of the support structure comprises a notch. The notch has a geometrical shape to firmly receive the helical ends without mechanical play.

Figure 4A:
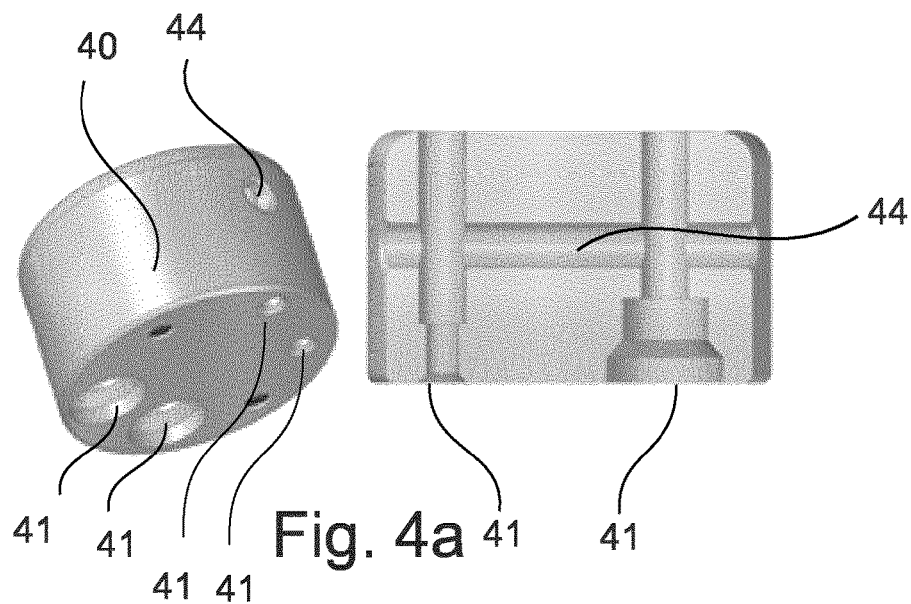
FIGS. 4a to 4d show an embodiment of different steps of a method for assembly of a cathode for an X-ray tube according to the present invention in a perspective view.
Figures 4B, 4C:
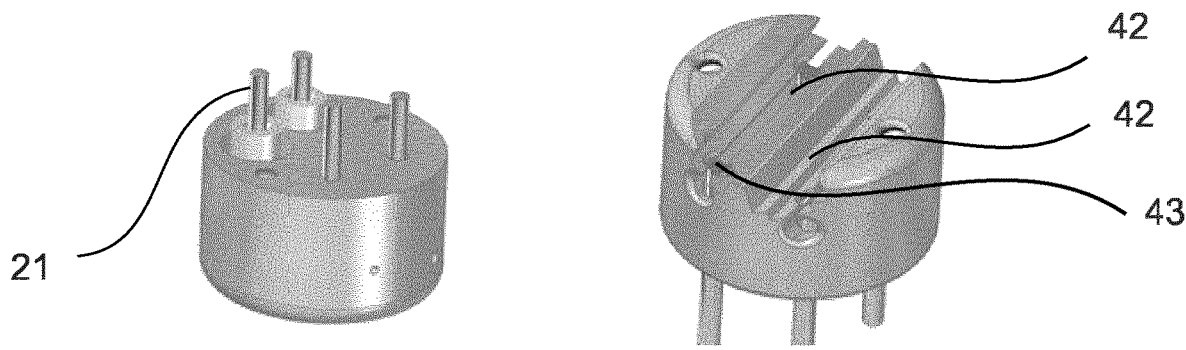
Figure 4D:
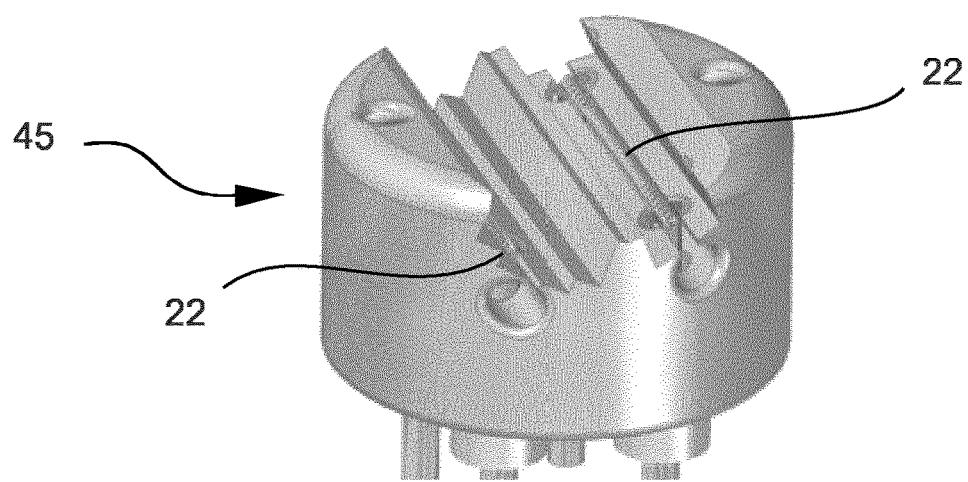

In FIGS. 3a to 3g 7 different kinds of notches are shown to accommodate the ends of the helical structure. 3a is a click notch, 3b is a half cylinder notch, 3c is a trough notch, 3d is a rectangle notch, 3e is a sideway click notch, 3f is a tapered click notch, 3g is a thin click notch, 3h is narrow notch for receiving a straight wire end of a at least partially helical filament which exhibits a helical winding structure and straight wires as legs parallel to the longitudinal direction around which the helical winding of the filament is provided. In FIGS. 4a to 4d, according to the invention, four drawings are shown which represent the assembly status of a cathode when a method for assembly of a cathode for an X-ray tube is performed. FIG. 4a left shows a perspective view of a body structure 40 of cathode cup with four support structure holes 41. FIG. 4a right shows a cross section through two support structure holes for inserting support structures for receiving a filament. In FIG. 4b the body structure of a cathode cup is shown after inserting and soldering four support structures 21 in the support structure holes 41. In FIG. 4c the body structure of the cathode cup is shown after machining two recesses 42 by wire cut electrical discharge machining (EDM), forming two filament spaces 42, into the cathode cup. In FIG. 4c the cathode cup is shown wherein in the same machining action as machining the recesses machining the support structures 21 are machined by forming a notch 43 at a reception end of each of the support structures to receive the ends of a helical filament. A horizontal bore 44 allows for a single (EDM) machining step that cuts both the cavity in the head 40 and the reception in the support structures 21. In FIG. 4d the ready cathode cup 45 is shown after inserting each of four ends of two filaments 22 as described with FIG. 2c into each of the notches of the support structures 21. Thus in total two such filaments are inserted. The figures show only one ceramic per filament. There can be a higher number and different types of ceramics.

Figure 5A:
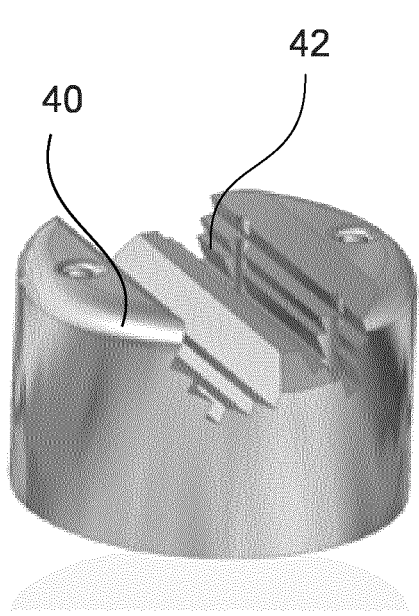
FIGS. 5a to 5d shows a further embodiment of different steps of a method for assembly of a cathode for an X-ray tube according to the present invention in a perspective view.
Figure 5B:
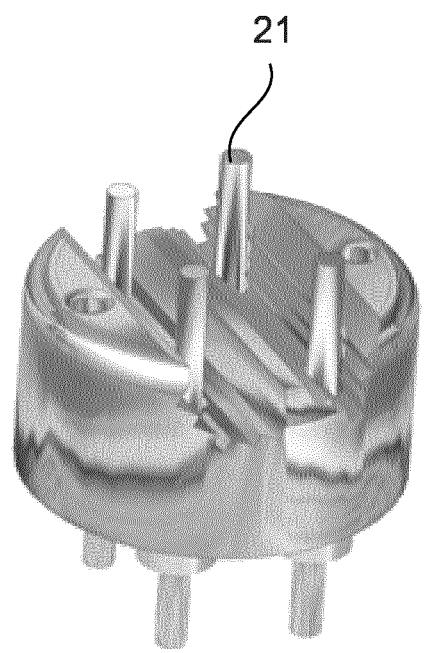
Figure 5C:
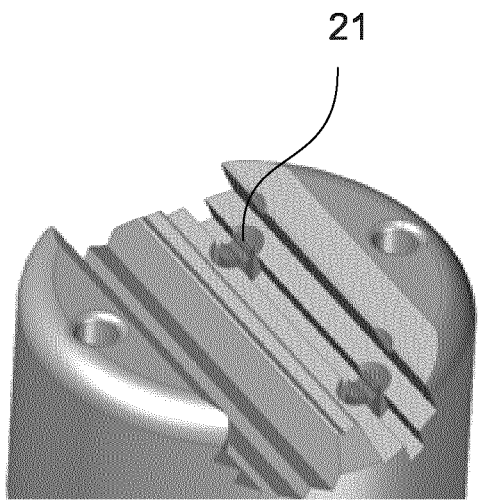
Figure 5D:
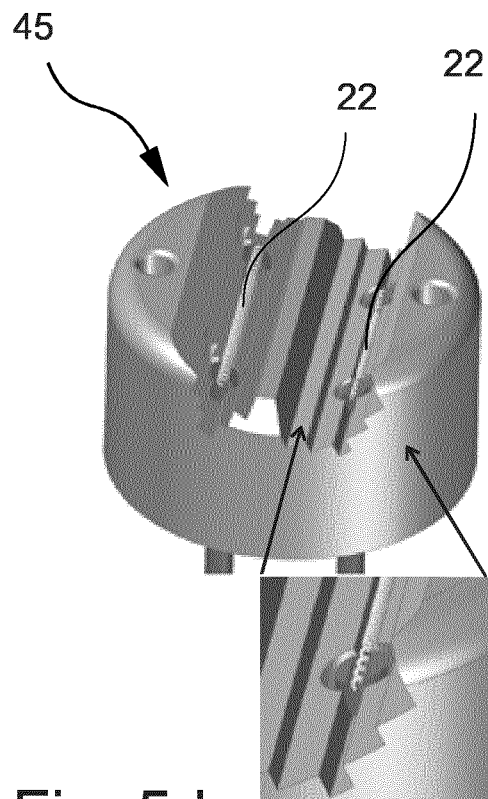

In FIGS. 5a to 5d according to another embodiment of the invention, four drawings are shown which represent the assembly status of a cathode when a method for assembly of a cathode for an X-ray tube is performed. In FIG. 5a a body structure 40 of a cathode cup is show with four support structure holes after machining two recesses 42, forming filament spaces, into the cathode cup. The horizontal bore 44 is not necessary in this embodiment. In FIG. 5*b* the body structure of the cathode cup is shown after inserting and soldering four support structures 21 in the support structure holes. In FIG. 5*c* the body structure of the cathode cup is shown after machining the support structures by forming a notch at the top of each of the support structures 21 to receive the end of a helical filament. In FIG. 5*d* the ready cathode cup 45 is shown after inserting each of 4 ends of two filaments 22, as described with FIG. 2*c*, into each of the notches of the support structures 21. FIG. 5*d* additionally shows a close up of the support structure end with notch and inserted filament. Compared to FIG. 4 the order of two steps is reversed so that the machining steps of machining the recesses and machining the support structures are not performed in one action but after inserting and soldering the support structures. The machining is also EDM.

Before inserting each end of a filament, as described with FIG. 2*c*, into each of the notches of the support structures a total recrystallization of the filament is provided by applying external heat. This applies to both embodiments as described in FIGS. 4 and 5.

Further, the mounting bolts of the support structure 21 are extending through the body structure 41. Therefore, a stepped through-hole 41 is provided with an upper portion having a larger diameter than the lower portion corresponding to either the diameter of the mounting bolt or the ceramic. Thus, the brazing, e.g. high temperature soldering, to the body structure 41 can be provided in the lower part, whereas at the upper part, the bolts are not coupled to the body structure 41 allowing for high thermal loads of the filament core while thermally protecting the brazed connection.

According to the present invention, the filament 22 is totally recrystallized, to achieve required straightness in operation over time. For example, the filament 22 is made of W. A cylindrical shaped guiding pin may be provided inserted into the helical structure during the recrystallization.

With reference to FIGS. 4 and 5, according to an example, the cathode is provided as a cathode cup, for example the cathode cup 45. The cathode cup may be provided as a ceramic cathode cup, made from electrically non-conducting ceramic. A part of the cathode cup's surfaces is provided with a metallic coating.

For example, the metallization is provided on the surfaces for brazing and electrical purposes, e.g. to avoid surface charges.

Figure 6:
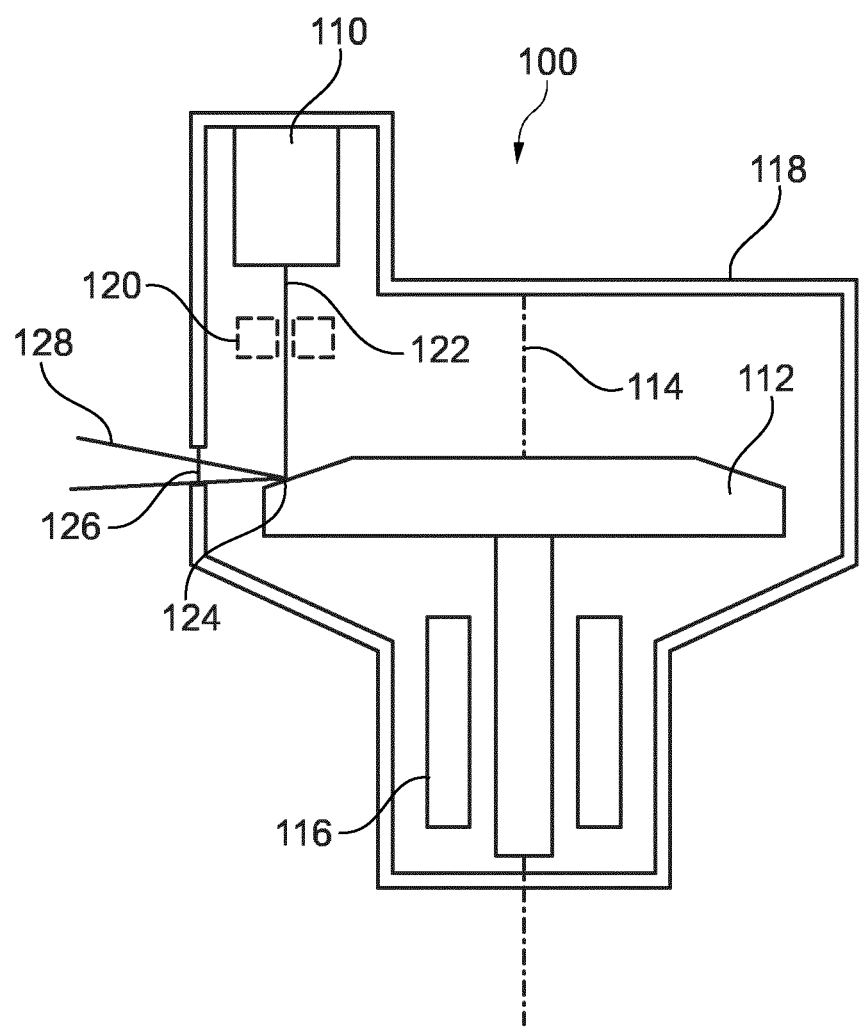
FIG. 6 shows an example of an X-ray tube according to the present invention in a cross-section.

FIG. 6 shows an X-ray tube 100 comprising a cathode 110, and an anode 112. The cathode is provided as a cathode according to one of the above mentioned and described examples.

For example, the X-ray tube is provided with a rotating anode 112, indicated with a rotation axis 114. For this purpose, driving device 116 is indicated, whereas only the parts inside a tube housing 118 are shown, neglecting any parts being outside, for example a scatter of the driving means. Further, steering or deflection means device 120 is shown for deflecting an electron beam 122 from the cathode 110 towards a focal spot portion 124 on the anode 112. An X-ray transparent window 126 is shown such that an X-ray beam 128 is radiated towards a not further shown object. It must be noted that FIG. 6 is a schematic drawing of an X-ray tube.

Further, according to the present invention, also a system 200 for X-ray imaging is provided, comprising an X-ray source 210, and X-ray detector 212, and a processing unit 214. The processing unit 214 is configured to control the X-ray source 210 and the X-ray detector 212 for providing X-ray image data of an object of interest 216. The X-ray source 210 is provided as an X-ray tube 100 according to the above mentioned example.

Figure 7A:
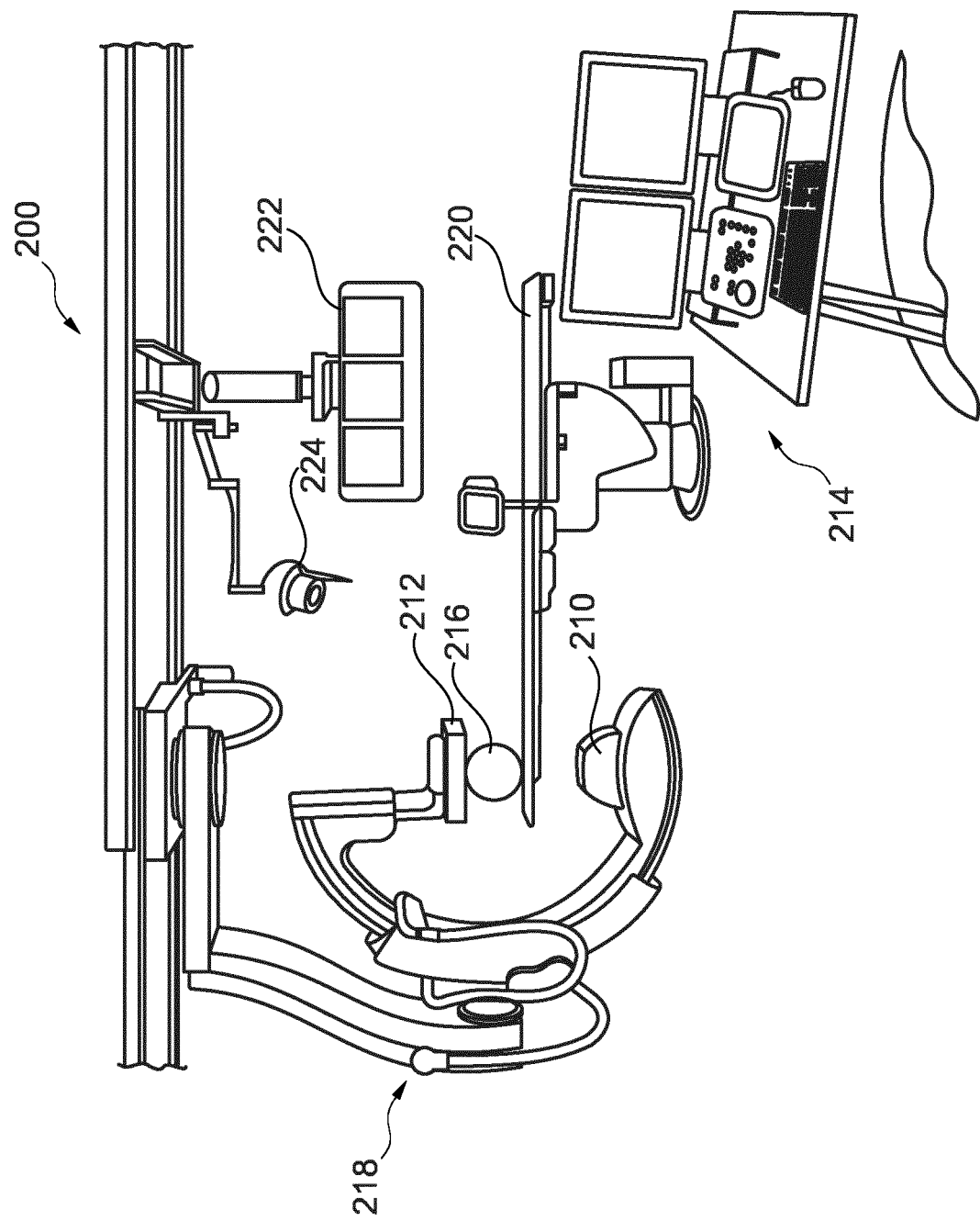
FIG. 7a shows a medical imaging system and FIG. 7b shows an inspection apparatus, for example for scanning and screening of luggage pieces.
Figure 7B:
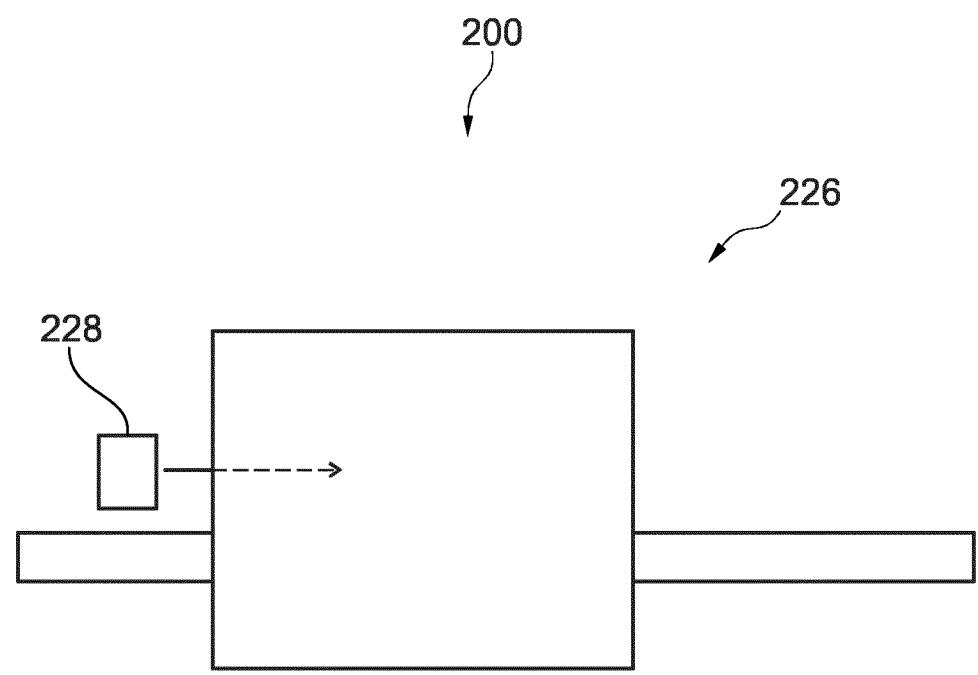

For example, the X-ray system may be a medical imaging system as shown in FIG. 7*a*. As can be seen, the X-ray source 210 and the X-ray detector 212 are provided as a so-called C-arm arrangement 218, where a C-arm structure is movably mounted to a support arrangement in order to provide free arrangement of the source and detector around the object of interest. For example, a patient table as well as monitoring devices 222 and lighting devices 224 are shown indicating an operational room in a hospital. Alternatively the X-ray system may be any other medical imaging system in which an X-ray source including a cathode according to the invention is used, e.g. a CT X-ray imaging system. However, according to the present invention also an inspection apparatus 226 is provided, for example for scanning and screening of luggage pieces 228, or for material and construction inspection. This is shown in FIG. 7*b* as a further example for an X-ray system 200 for X-ray imaging, comprising an X-ray source which is provided as an X-ray tube according to the above mentioned examples. It is noted that the X-ray source is not further shown in FIG. 7*b*.

Figure 8:
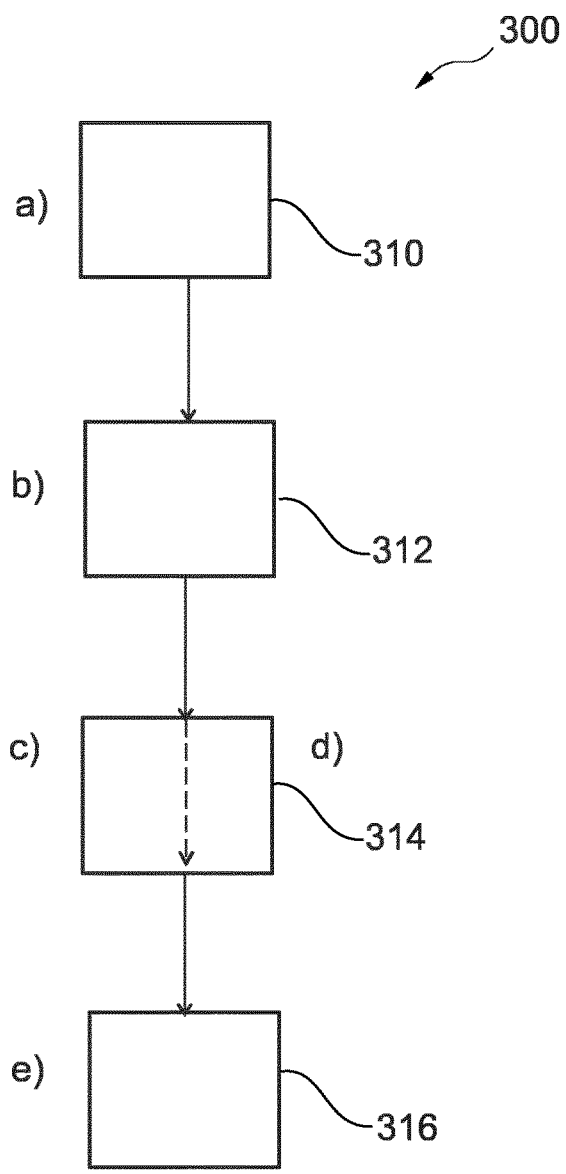
FIG. 8 shows basic steps of a method according to the present invention.

FIG. 8 shows a method 300 for an assembly of a cathode for an X-ray tube, comprising the following steps: a) providing (310) a cathode cup with at least two support structure holes; b) inserting and soldering (312) at least two support structures in the support structure holes; c) machining a recess (314), forming a filament space, into the cathode cup; d) in the same machining action as c) machining the support structures (314) by forming a notch at the top of each of the support structures to receive the end of a helical filament; and e) inserting (316) each end of a totally recrystallized filament, having at least a partial helical structure, into each of the notches of the support structures. In this case the filament has a complete helical structure (22, 23) extending from one end of the filament to the other end of the filament. The filament is configured to emit electrons towards an anode in an electron emitting direction.

According to a further example (not further shown), before step e), the total recrystallization of the filament is provided by applying external heat.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for assembly of a cathode for an X-ray tube, the method comprising:
   providing a cathode cup with at least two support structure holes;
   inserting and soldering at least two support structures in the support structure holes;
   using one machining action to form 1) a recess as a filament cavity in the cathode cup and 2) a notch at a receiving end of each support structure to receive an end of a filament; and
   inserting each end of the filament, having at least a partial helical structure, into each notch of the support structures, wherein the filament has been recrystallized.

2. The method according to claim 1, wherein the filament has a complete helical structure extending from one end of the filament to the other end of the filament.

3. The method according to claim 1, wherein the machining is electrical discharge machining.

4. The method according to claim 1, wherein a longitudinal direction around which the helical winding of the filament is provided is substantially straight.

5. The method according to claim 1, wherein a middle portion of the helical structure has a first helical pitch, and the helical ends of the helical structure have a second helical pitch.

6. The method according to claim 1, wherein the notch has a geometrical shape to firmly receive the helical ends without mechanical play.

7. The method according to claim 1, wherein a body structure is the cathode cup comprising the recess for fixedly holding the filament.

8. The method according to claim 7, wherein the cathode cup is provided with at least two filaments facing an anode.

9. The method according to claim 7, wherein the cathode cup is provided as a ceramic cathode cup made from an electrically non-conducting ceramic, and wherein a part of the cathode cup surfaces is provided with a metallic coating.

* * * * *